US008206820B2

(12) United States Patent
Bogaerts et al.

(10) Patent No.: US 8,206,820 B2
(45) Date of Patent: Jun. 26, 2012

(54) CLEANING IMPLEMENT

(75) Inventors: Iris Bogaerts, Mechelen (BE); Denis Alfred Gonzales, Brussels (BE); Wolfgang Edgar Huhn, Chieti (IT); Stefano Scialla, Rome (IT); Vincenzo Tomarchio, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 994 days.

(21) Appl. No.: 11/653,738

(22) Filed: Jan. 16, 2007

(65) Prior Publication Data

US 2007/0157405 A1    Jul. 12, 2007

Related U.S. Application Data

(63) Continuation of application No. PCT/IB2007/050100, filed on Jan. 12, 2007.

(30) Foreign Application Priority Data

Jan. 12, 2006   (EP) ..................................... 06100286
Oct. 16, 2006   (EP) ..................................... 06021614

(51) Int. Cl.
*B32B 3/26*       (2006.01)
*A46B 5/00*       (2006.01)

(52) U.S. Cl. ............... 428/305.5; 428/306.6; 428/316.6; 15/145; 15/104.93; 15/244.4

(58) Field of Classification Search ............... 428/316.6, 428/317.9, 315.5, 315.7, 305.5, 306.6; 15/104.93, 15/244.4, 145
See application file for complete search history.

(56) References Cited

U.S. PATENT DOCUMENTS

| 5,429,628 | A | * | 7/1995 | Trinh et al. .................... 604/359 |
| 2005/0079991 | A1 | * | 4/2005 | Ranade et al. ................. 510/457 |
| 2005/0136238 | A1 | * | 6/2005 | Lindsay et al. ............. 428/304.4 |
| 2005/0202232 | A1 | | 9/2005 | Sauniere |
| 2006/0246272 | A1 | * | 11/2006 | Zhang et al. ................ 428/304.4 |
| 2008/0300329 | A1 | * | 12/2008 | Fechtenkotter et al. ........ 521/65 |

FOREIGN PATENT DOCUMENTS

| JP | 63196699 A | | 8/1988 |
| WO | WO 2006008054 A1 | * | 1/2006 |
| WO | WO 2006/017298 | | 2/2006 |

* cited by examiner

*Primary Examiner* — Hai Vo
(74) *Attorney, Agent, or Firm* — Brent M. Peebles; Amy I. Ahn-Roll; John T. Dipre

(57) ABSTRACT

The present invention envisages a cleaning implement comprising a melamine foam preferably having a thickness of at least about 5 mm and a perfume source, processes for making them and methods for using them.

8 Claims, No Drawings

CLEANING IMPLEMENT

CROSS REFERENCE TO RELATED APPLICATION

This application is a continuation of International Serial No. WO/IB2007/050100 filed Jan. 12, 2007.

TECHNICAL FIELD

The present application is in the field of cleaning implements, in particular it relates to fragranced melamine foam cleaning implements, uses for the implements and processes for making the implements.

BACKGROUND OF THE INVENTION

It has recently been discovered that melamine foams can be used for hard surface cleaning. Indeed cleaning implements made from cut or moulded pieces of melamine foam have become a popular means for removing soils and stains from hard surfaces. Melamine foam sponges are currently marketed under the tradename Mr. Clean Magic Eraser®. It is has been observed that melamine foam shows an excellent soil and/or stain removal performance when used on hard surfaces, especially when it has been wetted with an appropriate solvent, such as tap water. See for instance WO06/017298. Without being bound by any theory, melamine foam hard surface cleaning implements are generally used repeatedly, which involves the repeated wetting of parts of the melamine foam. As cleaning implements they are also popular because they don't require the use of separate cleaning adjuncts to achieve high performance cleaning. Due to the unique way in which melamine foam cleaning implements are used and the fact they are often used to remove soils resulting from food or drink, there is a need for ensuring that there is not a build-up of malodour due to the soils or the melamine foam's repeated wetting and use. JP63196699A discloses a synthetic resin foam, having a cleaning soap impregnated in the cells of the foam and optionally a perfume, a dye and other additives. The synthetic resin may include a thermosetting phenolic, melamine, urea, alkide and polyiscocyanate resins; however, a soft polyurethane foam is preferred. The sponge is wetted before use. US2005/0202232 discloses a method for manufacturing a cleaning towelette having a total thickness of less than 5 mm, and comprising melamine foam having a thickness of less than 1 mm. The towelettes may comprise non-woven reinforcing layers and may be imbibed with a liquid composition selected from a moisturising solution, a soap, a deodorant, a perfume, a make-up removing composition, an emollient, an ointment, an antiseptic, water hydrogen peroxide solution or a mixture thereof. The cleaning towelettes are however not suitable for use on dried on or stubborn soils on uneven surfaces. There is therefore a need for increasing the working life of such cleaning implements and ensuring that they can be used repeatedly without the risk of the build-up of malodour. The present invention seeks to provide an improved melamine foam hard surface cleaning implement.

SUMMARY OF THE INVENTION

In a first aspect of the present invention there is provided a cleaning implement comprising melamine foam and a perfume source. Preferably the melamine foam has a thickness of at least 5 mm, preferably from 10 mm to 100 mm, preferably at least 15 mm, more preferably from 15 mm to 50 mm, even more preferably from 20 mm to 40 mm. The cleaning implement comprising a melamine foam having a thickness of at least 5 mm and a perfume source has the advantage of providing excellent hard surface cleaning without the need for additional cleaning adjuncts, while also being able to be used and stored repeatedly without the fear of malodour. The cleaning implement can also be used to impart a desirable odour on the surface so cleaned.

In a preferred embodiment of the present invention the perfume source is selected from the group consisting of perfume encapsulates; perfume loaded carrier particles; complexed perfume compositions, such as amine-assisted perfume delivery compositions and cyclodextrin complexed perfume delivery compositions; nano-latex perfume delivery systems; matrix polymer-assisted delivery compositions; perfumed polymers; and combinations thereof. In some embodiments, the perfume source may be perfume oil. These types of perfume source are particularly preferred as they are well characterised, are compatible with the melamine foams and supporting materials, and many of them allow great control over the delivery of the perfume. In a further preferred embodiment of the present invention the cleaning implement is capable of delivering perfume during use at least until substantially all of the melamine foam has been used. By "substantially all the melamine foam has been used" it is meant that preferably at least 50% of the melamine foam, more preferably 75% of the melamine foam, more preferably still 90% of melamine foam, even more preferably 95%, and most preferably 100% of the melamine foam by weight of the melamine foam has been used. Preferably, the perfume source is capable of delivering perfume during a plurality of separate uses, more preferably during each use. Variations in perfume odour are undesirable as smell is a key indicator of product performance to consumers. A decrease in perfume odour may mistakenly inform a consumer that a product is no longer suitable for use; that they have not been using it properly; or that it will not work as desired. Thus, providing a clear and consistent message to the user, as in the present invention, is key to consumer acceptance, and therefore a key advantage of the present invention.

In a preferred embodiment of the present invention, the cleaning implement also comprises at least one layer of supporting material. The supporting material may preferably be selected from the group consisting of foams, non-woven fibres, woven fibres, films, scrims, grids, or any other suitable means for providing mechanical support to the melamine foam; foams and non-wovens are preferred; foams are most preferred. The supporting material may preferably comprise a material selected from the group consisting of polyurethane, polypropylene, polyethylene, cellulose foam sponges, open-cell polyester foams, cross-linked polyethylene, polyimides, copolymers thereof, homologs thereof, naturally occurring sponges, and combinations thereof. Typically, the supporting material will provide structural support, be able to absorb any excess water during use and/or aid with the break-up of more stubborn soils. In another preferred embodiment, the cleaning implement may comprise at least two layers of melamine foam with each layer of melamine foam being separated from the next layer of melamine foam by at least one layer of the supporting material. In another preferred embodiment, the cleaning implement may comprise two or more layers of melamine foam with no supporting material. Using multiple layers of melamine foam and supporting material typically enables greater control over the functionality of the cleaning implement. For instance, a cleaning implement having a central layer of supporting material separating two layers of melamine foam, will benefit from the structural support provided by the supporting material, as well as any additional abrasiveness available using its exposed edges, and will have a far greater area of melamine foam for use in comparison to a system comprising only a single layer of melamine foam and supporting material of the same thickness.

In another embodiment of the present invention, the perfume source may preferably be located throughout said melamine foam. Preferably, the melamine foam will have substantially the same concentration of perfume source located throughout its volume. Preferably, the perfume source is distributed such that any piece of said foam of 1 cm$^3$, more preferably 0.5 cm$^3$, more preferably 0.1 cm$^3$ and most preferably 0.01 cm$^3$ in volume will comprise the perfume source at a concentration, that is to say the mass of perfume source per unit volume of melamine foam, substantially similar to the mean perfume source concentration across the whole of said melamine foam. Preferably, any such volume will comprise a level of perfume source having a difference from the mean concentration of perfume source of less than 25%, preferably less than 15% and even more preferably less than 10%. The concentration of perfume source within said foam may be measured by using any means known in the art, in particular gravimetric analysis or chromatography. By locating the perfume source throughout the melamine foam the cleaning implement has the advantage that no matter how much melamine foam is consumed during use; if there is melamine foam remaining that can be used; upon use it will deliver perfume. In another embodiment of the present invention, the perfume source may form at least one plane of material through the melamine foam. A plane of material is understood to mean a layer of perfume source which crosses through the melamine foam and which intersects one axis of the foam while running parallel to the other two. Preferably, in the case of a cuboidal cleaning implement, the plane of material crosses the thickness and runs parallel to the width and length of the melamine foam. The advantage provided by this arrangement is that it ensures good distribution of perfume source within the foam and thereby ensures delivery even as the melamine foam is consumed during use. In another embodiment of the present invention, when a supporting material is used, the perfume source may preferably be located within the supporting material. The supporting material as a location for the perfume source has the advantage of not being consumed during the use of the product, thereby allowing the perfume source to deliver perfume past the lifetime of the melamine foam. Preferably, the perfume source may be located either substantially throughout the supporting material, in concentrated volumes within the supporting material, as a thin layer or layers across the thickness, length and/or breadth of the supporting material, or combinations thereof. Preferably, the perfume source may be bound to the supporting material and/or freely located within the supporting material and/or absorbed into the supporting material. Another advantage of having the perfume source in the supporting material is that where the supporting material is used to provide additional scouring performance, the perfume may cover any odour associated with soil that is left in the supporting material.

In a preferred embodiment of the present invention, when the cleaning implement comprises melamine foam and supporting material (either multiple alternating layers or one layer of each), the perfume source may be located along the interface between the melamine foam and supporting material. The perfume source will preferably cover at least a portion of the interface and most preferably the whole of the interface. Again, because the interface between the melamine foam and the supporting material is typically not consumed during the use of the cleaning implement, the perfume source will be available for at least the lifetime of the product. In another embodiment of the present invention the perfume source is located in the melamine foam and/or supporting material in at least one discreet volume, preferably a plurality of discrete volumes, of perfume source. Preferably the discreet volumes are from 0.1 mm$^3$ to 5 cm$^3$ in volume, more preferably from 1 mm$^3$ to 1 cm$^3$ in volume, or even more preferably 1 mm$^3$ to 0.1 cm$^3$ in volume. Preferably, the perfume source is a matrix polymer-assisted delivery composition, more preferably the matrix polymer-assisted delivery composition is delivered in the form of a hot melt, and even more preferably it has a melting point below 100° C., preferably below 70° C. It is preferred that the discreet volumes of perfume source are formed by delivering, preferably syringing, the molten perfume matrix into the melamine foam and/or supporting material and allowing it to set therein. As the matrix polymer-assisted delivery composition is delivered, preferably syringed, into the melamine foam or supporting material and becomes anchored therein, it is possible to ensure that the matrix-assisted delivery composition does not breach the surface of the melamine foam or supporting material.

In a further preferred embodiment of the present invention, when the cleaning implement comprises multiple layers of melamine foam, or melamine foam and supporting material, adjacent layers of foam and/or supporting material are joined by means of a permanent attachment. Preferably the permanent attachment is selected from the group consisting of foam-flame laminating the two layers together; use of a permanent adhesive; sewing the two layers together; and needle-punching the two layers together; forming the melamine foam in the presence of the supporting material; and combinations thereof. This has the advantage of not only structurally improving the cleaning implement, but also providing the interface between the layers where, in certain embodiments, the perfume may be located. In a particularly preferred embodiment of the present invention the permanent attachment will be a permanent adhesive and the permanent adhesive will comprise the perfume source. Preferably, the perfume source will be located within or on top of the adhesive. Preferably, the perfume source is mixed with the adhesive prior to it being applied. This has the advantage of ensuring that the perfume is well distributed across the interface between the adhered materials. The adhesive may also be applied to one of either the melamine foam or supporting material, then have a perfume source distributed across at least a part of its surface, before the adhesive is used to fix the first foam to the second material. Preferably, the perfume source incorporated either on top of or within said adhesive is a polymer encapsulated perfume. Preferably the size of the polymer encapsulate is used to control perfume release. By having a perfume encapsulate smaller than the size of the pores of either the melamine or supporting material, preferably less than about 100 microns, more preferably from about 5 to about 50 microns, the perfume may be released rapidly to the surface. By having a perfume encapsulate with a diameter greater than or very similar to that of the pores of the melamine or supporting material the perfume will only be released once that area of the cleaning implement becomes exposed. In this instance, the polymer encapsulates would preferably have a diameter of greater than about 200 microns, preferably from about 150 microns to about 400 microns. Preferably, a combination of both larger and smaller perfume encapsulates can be used in combination. Preferably, different or the same perfumes may be encapsulated in either the larger or smaller polymer encapsulates. The perfume sources itself may also preferably form the adhesive. Preferably this will be the case when the perfume source is matrix polymer-assisted delivery composition.

In a preferred embodiment of the present invention delivery of the perfume from the perfume source is triggered by moisture, pressure, pH, ionic strength, temperature or combinations thereof. Typically, moisture is understood to encompass the water applied when the cleaning implement is used and/or the water present in the surrounding atmosphere as a result of the humidity. It is preferable to have a perfume source that releases perfume as a result of external stimuli as this means that the moment at which perfume is delivered may be controlled. In a preferred embodiment of the present invention the perfume source is selected from the group consisting of perfume loaded carrier particles or perfume encapsulates; and the perfume source is located within or throughout the melamine foam and/or within the supporting material when it is a foam; and the perfume source is bound therein by an adhesive or physically held therein by its size. Preferably, when the perfume is adhered to the melamine foam or supporting material it is done so by being introduced, preferably sprayed, into the foam in combination with an adhesive; thereby fixing the perfume source to the melamine foam or supporting material. Preferably, when the perfume source is physically held within the melamine foam, or supporting material when it is a foam, the perfume source is coated with a swellable polymer. Preferably, the coated perfume source prior to swelling has a diameter less than that of the pores of the melamine foam or supporting foam. Once the coated perfume source is in its desired location within the melamine or supporting foam an external stimulus will cause the swellable coating to swell to a size which will either prevent or significantly limit the ability of the perfume source to move within the foam. Preferably, the swollen coated perfume source will have a size greater than, equal to or very similar to that of the pores of the melamine or supporting foam. Preferably, the swelling of the swellable coating will be triggered by moisture, pH, or combinations thereof. In a particularly preferred embodiment the swellable coating will comprise a water swellable polymer, preferably selected from the group consisting of polyacrylate, polyvinyl pyrrolidone, polysaccharide, polyvinyl alcohol, polyalginate, homologs thereof and copolymers thereof. Preferably, the coated perfume source will have a diameter of less than 100 microns, preferably, less than 75 microns or even more preferably less than 50 microns before swelling. Preferably, the coated perfume source will have a diameter of greater than 150 microns, more preferably greater than 200 microns, and even more preferably greater than 250 microns when swollen. This provides a particularly advantageous embodiment, as being able to lock the perfume source within the melamine or supporting material ensures that perfume delivery can be delayed until when that particular part of the foam is exposed or in use. Preferably, the coating itself may be adherent; that is to say, capable of adhering the perfume source so coated to the melamine foam or supporting material. Preferably, the coating material may also be a polymer or compound which is soluble, more preferably of a solubility such that it dissolves slowly over a plurality of uses, thereby ensuring release over the life of the product. In a further preferred embodiment of the present invention the same perfume source is used in at least two locations within the cleaning implement. This has the advantage of providing a consistent cleaning signal independent of which part of the cleaning implement is in use. In another preferred embodiment of the present invention different perfume sources are used in at least two locations within the cleaning implement. This may be used to indicate different functions or provide different perfumes during different operations, such as during storage and cleaning.

In another embodiment of the present invention the cleaning implement further comprises an odour control agent. Preferred odour control agents may be selected from the group consisting of uncomplexed cyclodextrin, flavanoids, zeolites, activated carbon and mixtures thereof. Preferably, the odour control agent may also be located either throughout the melamine foam, within the supporting material, along the interface between the melamine and supporting material, or combinations thereof. Preferably, the odour control agent may be sprayed onto or into the melamine foam and/or supporting material. When an odour control agent is present the perfume source and perfume used must be compatible with the odour control agent. A cleaning implement comprising an odour control agent has the advantage of removing any malodour, rather than only relying on the perfume to cover it. The present invention also relates to a method for cleaning surfaces comprising wetting the cleaning implement and then preferably contacting the surface which requires cleaning with the wetted implement. Preferably, the supporting material may be used to absorb any excess water. The present invention also relates to the use of a cleaning implement comprising melamine foam, preferably having a thickness of at least 5 mm, and a perfume source for cleaning hard surfaces and for imparting perfume on surfaces. The present invention also relates to processes and methods of manufacture of cleaning implements comprising a melamine foam, preferably having a thickness of at least 5 mm, and a perfume source.

DETAILED DESCRIPTION OF THE INVENTION

The present invention envisages cleaning implements comprising a melamine foam, preferably having a thickness of at least 5 mm, and a perfume source, processes for making them and methods for using them. The cleaning implements provide outstanding cleaning, while releasing a pleasant odour throughout their lifespan and during multiple uses. Preferably, the cleaning implement is essentially free from soaps or surfactants. Perfume is understood to have its normal and ordinary meaning in the art: typically, a compound or composition which is used to provide a desired scent or aroma on account of its odour. Perfume materials are described more fully in S. Arctander, Perfume Flavours and Chemicals Vols. I and II, Author Montclair, N.J., and the Merck Index, $8^{th}$ Edition, Merck & Co. Inc. Rahway, N.J. Particularly preferred perfumes are described in U.S. Pat. No. 6,869,923. A perfume source is understood to mean a composition, chemical or any other suitable means from which a perfume may emanate, preferably including the perfume itself. Preferably the perfume source may be bound to the melamine or supporting material, absorbed into the polymer from which the melamine or supporting material is made, or unbound; that is to say, not bound to the melamine or supporting material or absorbed therein.

Typically, perfumed polymers are polymers in which a perfume has been absorbed, or dissolved, so that it may then be released over a prolonged period of time. The perfumed polymers may make up the supporting material or be present as particles within the cleaning implement. Polymers which are preferred for use as supporting material due to their ability to absorb and then slowly release perfumes are polypropylene, polyethylene, polyimide, polyester, copolymers comprising any of the monomers of said polymers, particularly block copolymers, and combinations thereof. Other polymers which can typically be used include cellulose and polyurethane foams. The perfume-absorbing polymers may be mixed with supporting material polymers when forming the supporting material to improve the supporting material's polymers' capacity to absorb perfume. Preferably, the perfume is sprayed onto the supporting material in the form of a perfume oil and then absorbed by the material. The supporting material itself effectively becomes the perfume source. The perfumed polymers may also be introduced into the melamine foam or supporting material in the form of dry, melted, dispersed or emulsified particles, which may be sprayed into the melamine foam or supporting material and become incorporated therein, preferably, by spraying them in conjunction with an adhesive.

Alternatively the perfume source may be a perfume incorporated in a matrix polymer-assisted delivery composition. Typically, a matrix polymer-assisted delivery composition is understood to mean any composition where a perfume is absorbed into a polymer system, wherein the polarity of the polymer and perfume are closely matched, thereby allowing the perfume to emanate over an extended period of time. A preferred matrix polymer-assisted delivery composition comprises a polymeric composition comprising a copolymer of ethylene with at least another monomer comprising a heteroatom, more than 10% of a plasticizer or blend of plasticizers comprising a heteroatom. Such compositions can be applied as hot-melt adhesives, emulsions, and dispersions and even in combination with solvents, and have surprisingly good adhesion to most substrates. Without being bound by theory, it is believed that matching the polarity between the plasticized polymeric matrix and the perfume is required to provide good incorporation and sustained deliver of the volatile material. Hence the copolymer and plasticizer of the polymeric compositions can be preferably selected such that the polarity of the plasticized matrix substantially matches the polarity of the perfume. The polarity can be evaluated by calculating the octanol/water partitioning coefficient. The term monomer comprising at least a heteroatom includes all those monomers which comprise at least a C—X linkage in the molecule wherein X is not C or H. Said C—X linkage is a preferably a polar linkage. Preferably the carbon atom is linked to an N, S, F, Cl or O atom. More preferably the polar linkage is part of a carbonyl group, and more preferably an ester group. Preferred monomers comprising at least a heteroatom are vinyl acetate, vinyl alcohol, methyl acrylate, ethyl acrylate, butyl acrylate, acrylic acid and salts formed therefrom, methacrylic acid and salts formed therefrom, methacrylic acid and salts formed therefrom, maleic anhydride, glycidyl methacrylate and carbon monoxide. Suitable copolymers can be block or non-block copolymers, grafted copolymers, copolymers with side chains or crosslinks and copolymers where ethylene monomers are randomly copolymerised with monomers comprising at least a heteroatom. Among preferred copolymers of ethylene which are suitable for the present invention are, for example, ethylene-vinyl ester copolymers, ethylene-acrylic ester copolymers, ethylene-methacrylic ester copolymers, ethylene-acrylic acid copolymers and their salts, ethylene-methacrylic acid copolymers and their salts, ethylene-vinyl ester-maleic anhydride copolymers, ethylene-acrylic ester-maleic anhydride copolymers, ethylene-vinyl ester-glycidyl methacrylate copolymers, ethylene-acrylic ester-glycidyl methacrylate copolymers, ethylene-maleic anhydride copolymers, ethylene-glycidyl methacrylate copolymers. The monomer comprising at least a heteroatom in the copolymers suitable for the present invention preferably represent from 10% to 90% of the total weight of the copolymer, more preferably at least 14%, and most preferably at least 18%. Particularly preferred copolymers for the present invention are ethylene-vinyl acetate copolymers such as those sold under the trade names Elvax® by Dupont, Evathane® by Atofina, Escorene® by Exxon and Levapren® and Levamelt® by Bayer and ethylene-acrylic ester copolymers such as those sold under the name Lotryl® by Atofina and Acronal® from BASF. The second component in the polymeric composition is preferably a plasticizer or blend of plasticizers comprising at least one heteroatom, wherein the plasticizer is compatible with the copolymer of ethylene with at least one monomer comprising at least a heteroatom. The term plasticizer comprising at least a heteroatom is understood to include all those plasticizers which comprise at least a C—X linkage in which X is not C or H. Preferably, said linkage is a polar linkage. Preferably the carbon atom is linked to an N, S, F, Cl or O atom. More preferably said polar linkage is part of a carbonyl group and, more preferably, of an ester group. Suitable plasticizers include citric acid esters, low molecular weight polyesters, polyethers, liquid rosin esters, aromatic sulphonamides, phthalates, benzoates, sucrose esters, derivatives of polyfunctional alcohols (where polyfunctional means having 2 or more hydroxyl groups), adipates, tartrates, sebacates, esters of phosphoric acid, fatty acids and diacids, fatty alcohols and diols, epoxidized vegetable oils etc and mixtures thereof. As already mentioned above, the different polarity of the different compatible plasticizers (measurable with any method known to those skilled in the art, for example water/octanol partition coefficient) can be used to tune the polarity of the polymeric matrix in order to provide a better match with the polarity of the perfume. Preferably the polymeric compositions for use in the present invention comprises from 5% to 75%, more preferably from 10% to 50% by weight of the polymeric composition of the copolymer of ethylene with at least another monomer comprising at least a heteroatom; from 10% to 60%, preferably from 15% to 40% by weight of the polymeric composition, of the compatible plasticizer or blend of plasticizers comprising at least one heteroatom; and more than 10%, preferably more than 20%, more preferably more than 30% of a perfume; the perfume is preferably comprised up to a maximum percentage of 90% by weight of the polymeric composition. Typically, the polymeric compositions may also comprise additional optional components to further improve the processability of the compositions and also the mechanical characteristics as well as other characteristics, including tackiness, resistance to ageing by light, oxygen and heat, and the visual appearance etc. of the objects formed from such polymeric compositions. Further optional ingredients include other polymers or copolymers, fillers, crosslinkers, pigments, dyes, anti-oxidants and other stabilisers. Typically, the polymeric composition may also preferably include a tackifier. Tackifiers otherwise known as tackifier resins or tackifying resins are materials which are commonly sold as such and are used in hot-melt adhesives in order to improve the adhesive properties of the material. A good tackifier is compatible with the copolymer, has a low molecular weight with respect to the copolymer and a $T_g$ which is higher than that of the copolymer, so that when introduced into the polymeric composition the $T_g$ of said composition is increased. Preferred tackifiers for use herein are typically thermoplastic materials, stable at 200° C., amorphous glassy at room temperature, and having a $T_g$ higher than 50° C., preferably between 80° C. and 125° C. Preferred tackifiers for use herein have a molecular weight comprised between 500 and 2000 Daltons. Tackifiers are in general organic compounds with polycyclic structures, preferred are those which are non-aliphatic hydrocarbons. More preferred are aromatic tackifiers and tackifiers which comprise oxygen atoms. Most preferred tackifiers are rosin and its derivatives which are solid at room temperature. When present in the composition the tackifier will preferably represent from 10% to 60%, more preferably from 15% to 40% by weight of the copolymer. The polymeric compositions may be manufactured by using any known process for the manufacturing of thermoplastic polymeric compositions and will typically comprise the steps of melting the polymer and then homogenously blending the plasticizer if present, tackifier if present and the perfume to form a homogenous mass that is then cooled to obtain the polymeric composition. Among those thermoplastics compositions preferred are those which have a low melt temperature and viscosity and therefore are suitable for use as hot melts. In these systems, the loss of volatile material upon blending, as well as upon subsequent application in the molten state, is minimized. The polymeric compositions may also be prepared using a polymer solution, either as an intermediate or final step. Preparations of this type are well-known in the art and typically will include dissolving the polymer, tackifier and/or plasticizer and perfume in an effective solvent, and heating if necessary to prepare a solution or a gel. The solvent can then be eliminated by evaporation. Alternatively the polymeric compositions may be prepared in the form of an aqueous emulsion or dispersion.

Polytetramethylene glycol (PTMG) or a derivative thereof may be used in place of the copolymer of ethylene with at least another monomer comprising a heteroatom for forming a matrix polymer-assisted delivery composition. PTMG or its derivatives can be used at any molecular weight, preferred is molecular weight of from 500 to 3000, more preferably from 1500 to 300. In general higher molecular PTMG will provide compositions which are thicker than those provided by low molecular weight PTMG. Such derivatives exclude copolymers containing as building blocks PTMG and monomers not containing an ether group, such as those described in EP1531169. Also suitable are PTMG derivatives. PTMG derivatives are herein defined as those molecules in which PTMG itself constitutes more than 70%, preferably more than 80%, more preferably more than 90% of the total weight of the molecule. In general it is preferred to use PTMG and not a derivative thereof. Preferably, in the compositions comprising PTMG or PTMG derivatives, the ratio of PTMG or derivative to volatile material is from 1:10 to 10:1, preferably 1:3 to 3:1, more preferably from 1:2 to 2:1. A typical process comprises the steps of melting the PTMG (or derivative thereof) at a temperature of around 50° C. and then homogenously blending the perfume and the other optional ingredients to form a homogenous mass that is cooled to obtain the composition. A copolymer obtained from at least one monomer comprising an ether group and least one monomer not comprising an ether group can be used in place of the copolymer of ethylene with at least another monomer comprising a heteroatom. The term "monomer comprising an ether group" includes all those monomers wherein at least an oxygen atom is bonded to two different carbon atoms none of which is connected to another oxygen atom, including those where the oxygen atom is included in a cyclic epoxide structure such as for example ethylene oxide, propylene oxide, tetramethylene oxide and the like. The term "monomer comprising an ether group" also includes those molecules, oligomers or polymers which contain an ether group inside the molecule and might be further polymerised. In most cases, the copolymers will comprise a polyether group and a non polyether group. Such copolymers can be both block and non-block copolymers, also copolymers formed by the grafting of polyether groups onto polymer structures, copolymers where the polyether group is in a side chain or in a crosslink and copolymers where ether monomers are randomly copolymerised with non-ether monomers are suitable copolymers for the present invention. Among preferred copolymers obtained from at least one monomer comprising an ether group and at least one monomer not comprising an ether group which are suitable for the present invention are, for example, polyether amide copolymers, polyether ester copolymers, polyether urethanes, sulphonated polyether ester copolymers, polyether ester amide copolymers, polyether ester amide copolymers, and copolymers formed by the polymerisation of polyether acrylates with other acrylic monomers/oligomers. When a polyether group is present in the copolymer, preferred polyether groups are those with monomers which contain more than 2 carbon atoms, more preferred are those with monomers which contain more than 3 carbon atoms. Most preferred polyether containing groups are polypropylene glycol and, even more preferred, polytetramethylene glycol. The monomer comprising an ether group in the copolymers represents at least 5% of the total weight of the copolymer, preferably at least 10%, and even more preferably at least 15%. Preferred copolymers are poly-ether-amide block copolymers (e.g. Pebax®), poly-ether-ester-amide block copolymers, polyether polyester block copolymers (e.g. Hytrel®), and polyurethane copolymers containing polyether blocks (e.g. Estane®, Sancure® from Noveon, Astacin® from BASF), and poly-ether-vinylacetate or mixtures thereof. Among the various copolymers of this type those which have a preferred polyether group as mentioned above are most preferred. Therefore, the most preferred copolymers are those in which the polyether group is a polypropylene glycol or a polytetramethylene glycol. Surprisingly these compositions can typically be formulated as hot melts with very low application temperatures, typically below 100° C. and in some cases if desired even 70° C. This can be achieved by having low levels of plasticizer or no plasticizers at all. It is believed that this is due to the particular selection of tackifier and to the particular combination of ingredients of the compositions. This is a particularly desirable property of the composition as it enables processing without substantial loss of perfume during either the manufacture or subsequent application, both of which typically take place in the molten state. Again the polarity of the polymer composition is matched closely to that of the perfume. This may be done using any means known in the art, including by matching to the octanol/water partitioning coefficient of the perfume.

In all of the abovementioned matrix polymer-assisted delivery compositions it is believed that the long lasting perfume delivery is as a result of an interaction between the perfume and polymer composition at the molecular level. It is therefore preferred that the perfume is present in the polymer composition in the form of a chemically unmodified perfume oil and not in a form which prevents the perfume from becoming chemically dissolved in the plasticized polymer matrix. In particular encapsulated perfumes and perfumes where the perfume is covalently bonded to a non-volatile molecule are not preferred. When the matrix polymer-assisted delivery composition is applied as a hot-melt, emulsion, dispersion or solution, preferably it may typically be used to adhere multiple layers of foam to one another. This is particularly advantageous as it would simplify manufacturing. When present throughout the melamine foam or within the supporting material, the matrix polymer-assisted delivery composition may be applied using any of the techniques described above, including spraying, slot coating, roll coating, etc. When the matrix polymer-assisted delivery composition is present as discrete volumes in either the melamine or supporting material, it may be introduced by syringing or any other suitable means.

Perfume encapsulates, or microcapsules as they are sometimes referred to in the art, typically provide controlled release of the active material contained within the microcapsule. Typically, the microcapsules, when used as the perfume source of the present invention, can be any rupturable capsule containing a perfume or a capsule controllably penetrable by the perfume encapsulated therein. Preferably, the rupture strength of the microcapsule should be within a range that can endure handling without rupturing and yet rupture when exposed to the correct external stimuli. Preferably, said stimuli may be selected from the group consisting of pressure, moisture, pH, temperature, ionic strength or combinations thereof. The shell of the microcapsules can be made from a wide range of materials. Such materials are typically polymeric. Preferable, non-limiting examples of materials suitable for making the shell of the microcapsules herein include starch, chitosan, alginates, urea-formaldehyde, melamine-formaldehydes, phenol-formaldehydes, gelatine, poly(vinyl alcohol), poly(vinyl pyrrolidone), polyacrylates, polyamides, polyurethane, polymethacrylates, polyepoxides, cellulose acetate, cellulose nitrate, cellulose acetate butyrate, ethyl cellulose polyester, polychlorotrifluoroethylene, ethyl/vinyl acetate, saran, polystyrene, zein, paraffin wax, animal wax, vegetable wax, microcrystalline wax, polyethylene wax, and the like. Melamine microcapsules are particularly preferred as there is little of no release of perfume before the microcapsules are burst. Generally, the microcapsules will have an average diameter from 0.001 to 1000 microns, preferably from 1 to 500 microns, and even more preferably 10 to 250 microns. A variety of processes known in the art can be used to make the microcapsules. Examples of processes for making microcapsules are described in U.S. Pat. Nos. 2,800,458; 3,159,585; 3,516,846; 3,516,941; 3,533,958; 3,697,47; 3,778,383; 3,888,689; 3,965,033; 3,996,156; 4,010,038; 4,016,098; 4,087,376; 4,089,802; 4,100,103; 4,251,386; 4,269,729; 4,303,548; 4,460,722; and 4,610,927; UK Patent No.s 1,156,725; 1,483,542; 2,041,319 and 2,048,206; and Benita, Simon (ed.), MICROENCAPSULATION: METHODS AND INDUSTRIAL APPLICATION (Marcel Dekker, Inc. 1996). Microcapsules containing an active, preferably perfume, suitable for use in the present invention are described in detail in e.g. U.S. Pat. Nos. 3,888,689; 4,520,142; 5,126,061; and 5,591,146. Microcapsules containing perfume suitable for use in the present invention may be found in US 2005/0153135, EP1304044, U.S. Pat. No. 6,645,479, US2004/00771742, WO02/074430, US2004/0115091.

The perfume may also be adsorbed or absorbed onto a carrier particle. Typically, a carrier particle is understood to mean a porous particle which can absorb or adsorb a perfume and then release said perfume either over an extended period of time and/or as a result of an external stimuli. Preferably, said stimuli may be selected from the group consisting of pressure, moisture, pH, temperature, ionic strength or combinations thereof. Preferably, the carrier particle may comprise a material selected from the group consisting of amorphous silicates, crystalline non-layered silicates, layered silicates, calcium carbonates, calcium/sodium carbonate double salts, sodium carbonates, clays, metal oxides (e.g. alumina, aluminates, aluminosilicates), zeolites, sodalites, alkali metal phosphates, macroporous zeolites, chitin micro beads, carboxyalkylcellulose, carboxyalkylstarches, porous starches, chemically modified starches, starch derivatives, low and high molecular weight sugars, and sugar derivatives, fumed and precipitated silicas, and mixtures thereof. Zeolite is particularly preferred. Zeolites useful herein are disclosed in U.S. Pat. No. 5,955,419. Perfume loaded zeolites useful herein and methods for their manufacture are also disclosed in WO02/089862. Preferably the diameter of the perfume carrier is less than 100 microns, preferably less than 70 microns, preferably less than 40 microns, more preferably less than 30 microns and even more preferably less than 5 microns. Preferably the zeolite particles are greater than 0.01 microns in diameter. In another preferred embodiment the carrier particles may themselves be encapsulated. A preferred example comprises encapsulating perfume loaded zeolite particles with starch. The encapsulation provides increased protection prior to use. Preferably, the perfume loaded carrier particle may also be coated with a hygroscopic or deliquescent composition so as to reduce or prevent the release of perfume as a result of ambient humidity, and ensure that the perfume is not released until the cleaning implement is wetted during use. Water-donating materials may also be incorporated to encourage a background odour before wetting. A combination of hygroscopic or deliquescent materials and water-donating materials may be used to tune the release of perfume such that a desired amount is released prior to wetting, regardless of the ambient humidity, while still providing a burst of perfume upon exposure to water.

The perfume source may also be a complexed-perfume delivery composition; that is to say, a composition wherein the perfume is complexed with another molecule or molecules. The perfume complex may be formed before addition to the cleaning implement or the perfume and complexing agent may be added separately and thereby form the complexes once deposited upon the cleaning implement. Examples of suitable complexed-perfume delivery compositions as perfume sources for the present invention include cyclodextrin-perfume complex compositions and amine-assisted delivery compositions. The perfume source may be an amine-assisted delivery composition. Typically, amine assisted delivery system compositions comprise an amine compound and a perfume. Preferably there should be no reaction between these components prior to their depositing on the foam. Suitable amine compounds include monoamines and polyamines so long as at least 10% of its amino groups are primary amino groups. Preferably, the amine compound will be a polyamine and from 15-80% of its amino groups will be primary amino groups. Typically, the perfume must be in the form of perfume ketones or aldehydes and mixtures thereof. In addition, the perfume aldehydes materials will typically have relatively high molecular weight and have a relatively high boiling point. For purposes of the invention, high boiling point perfume aldehydes are those having a boiling point above 225° C. For the purpose of the invention, high molecular weight perfume aldehydes are those having a molecular weight above 150. Examples of amine assisted perfume delivery technologies are known in the art and may be found in WO2005/003434. The ketone or aldehyde perfume benefit agents may preferably be contained within polymer encapsulates. The perfume source may be in the form of a cyclodextrin-perfume complex. As used herein, the term cyclodextrin includes any of the known cyclodextrins such as unsubstituted cyclodextrins containing from 6 to 12 glucose units, especially, alpha-, beta-, gamma-cyclodextrins, and mixtures thereof, and/or their derivatives, and/or mixtures thereof, that are capable of forming inclusion complexes with perfume ingredients. Alpha-, beta-, and gamma-cyclodextrins can be obtained, from amongst others, American Maize-Products Company (Amaizo) and Roquette Corporation. There are many derivatives of cyclodextrins that are known. Representative derivatives are those disclosed in U.S. Pat.

Nos. 3,426,011; 3,453,257, 3,453,258, 3,453,259, and 3,453,260; 3,565,887; 4,616,008; 4,746,734; and 4,678,598. Examples of cyclodextrin derivatives suitable for use herein are methyl-β-cyclodextrin, hydroxyethyl-β-cylcodextrin and hydroxypropyl-β-cyclodextrin of different degrees of substitution, available from Amaizo and from Aldrich Chemical Company. Water-soluble derivatives are also highly desirable. The individual cyclodextrins can also be linked together using multifunctional agents to form oligomers, cooligomers, polymers, copolymers, etc. Examples of such materials are available from Amaizo and from Aldrich Chemical Company (e.g. β-cyclodextrin/epichlorohydrin copolymers). It is desirable to use mixtures of cyclodextrins and/or precursor compounds to provide a mixture of complexes. The cyclodextrins and perfume may be complexed either before being applied to the cleaning implement or once on the cleaning implement. Cyclodextrin-perfume complex compositions have the added advantage that once the perfume has been released from the cyclodextrin, the cyclodextrin is free to act as an odour control agent and absorb any malodour it may come into contact with. Suitable perfumes for use in the cyclodextrin-perfume complex compositions are listed in WO 91/17300.

The perfume source may also be in the form of a perfume absorbed into a nano-latex. Nano-latexes perfume delivery systems comprise a polymeric particle having a size between 100 nm and 50 μm and wherein the perfume is not chemically bound to the polymer from which said nano-latex particles are formed, preferably the polarity of the polymer from which said nano-latex particles are formed and the perfume are closely matched. Typically, the polymeric particle may be water insoluble. The polymeric particle preferably comprises monomers selected from the group consisting of cationic monomers, non-cationic monomers, and mixtures thereof. The polymeric particle will preferably comprise from 50% to 99.9%, preferably from 60% to 95% by weight of non-cationic monomers; from 0.1% to 50%, preferably from 1% to 10% by weight of cationic monomers; and from 0% to 25%, preferably from 1% to 10% by weight of cross-linking monomers. Preferably, the weight ratio of the non-cationic monomers to cationic monomers to crosslinking monomers in the monomer mixture is from about 10:0.02:0 to 5:2.5:1. Preferably, the cationic monomers comprise of a cationic unit. Typically, a cationic unit is understood to mean a moiety which when incorporated into the structure of the polymeric particle is capable of maintaining cationic charge within the pH range of from 2 to 8. The cationic unit is not required to be protonated at every pH value within the range of 2 to 8. Suitable cationic monomers include dimethylamino alkyl acrylates, especially dimethylaminoethyl methacrylate, vinyl pyrrolidones, vinyl imidazoyls, vinyl ethers having dialkyl amino groups, vinyl pyridines, alkyl acrylamides, dialkyl acrylamides, dialkylamino alkyl acrylamide, and amino alkyl acylamides. The non-cationic monomer may be a hydrophobic group-containing monomer. Examples of the hydrophobic group include, but are not limited to, alkyls, cylcoalkyls, aryls, alkaryls, aralkyls and mixtures thereof. Examples of suitable non-cationic-monomers include methyl methacrylate, methyl acrylate, ethyl acrylate, n-propyl acrylate, isopropyl acrylate, n-butyl acrylate, hydroxyethyl acrylate, hydroxypropyl acrylate, benzyl acrylate, ethylhexyl acrylate, n-propyl methacrylate, methacrylic acid, acrylic acid, acrylamide, methacrylamide, styrene, α-methyl styrene, hyroxyethyl methacrylate, hydroxypropyl methacrylate, hydroxybutyl acrylate, hydroxybutyl methacrylate, PEG acrylate, phenyl methacrylate, t-butyl methacrylamide, p-hydroxyphenyl methacrylamide, vinyl ethers vinyl ketones, vinyl acetates, vinyl phenols, acrylamido-2-methylpropanesulfonic acid, vinylsulfonate, vinylpropionate, methylallysulfonic acid, N-vinyl formamide and N-vinylpyrrolidone. Preferably the polymeric particle also comprises a crosslinking monomer. Non-limiting examples of suitable cross-linking monomers include diacrylate, dimethyl acrylate, diethylene glycol, diethylene glycol diacrylate, divinylbenzene, diviny ether, ethylene glycol dimethacrylate, pentaerythritol triacrylate, polallyl sucrose, trivinyl benzene, divinyl toluene, trivinyl toluene, triethyleneglycol dimethacrylate, tetraethyleneglycol dimethacrylate, allylmethacrylate, diallylmaleate, triallylmaleate, and 1,4-butanediol diacrylate, triallylmaleate 1,2-ethanediol diacrylate, 1,3-propanediol diacrylate, 1,6-hexanediol diacrylate, divinyl benzene, and ethylene glycol diacrylate. The polymers from which the nano-latex particles are made will preferably have a weight average molecular weight of from 1000 to 2000000, preferably from 10000 to 750000 and most preferably from 20000 to 500000 Daltons. The molecular weight may be determined by conventional means such as gel permeation chromatography. The monomers of polymeric particle may be selected such that they have an affinity for perfume. Preferably the perfume has at least one of the following properties: a Kovats Index of less than 1700, a molecular weight less than 200, a ClogP of less than 1.3 and/or a boiling point of less than 250° C. The boiling points of many perfume ingredients are reported in e.g. "Perfume and Flavor Chemicals (Aroma Chemicals)", Steffen Arctander, Published by the author, 1969. Otherwise they may be obtained using any means known in the art. The octanol/water partitioning coefficient of a material is the ratio between its equilibrium concentrations in octanol and water. The octanol/water partitioning coefficient can alternatively be reported on a base 10 logarithmic scale, as log P, and when the calculated value is reported, as ClogP. The perfume ingredients suitable for use in this invention typically have logP of less than 3. The logP of many perfume ingredients has been reported; for example, the Pomona92 database, available from Daylight. Chemical Information Systems, Inc. (Daylight CIS), Irvine, Calif., contains many, along with citations to the original literature. However, the logP values are most conveniently calculated by the CLOGP program, also available from Daylight CIS. This program also lists experimental values when they are available in the Pomona92 database. The "calculated logP" (ClogP) is determined by the fragment approach of Hansch and Leo (cf. Leo, in Comprehensive Medicinal Chemistry, Vol. 4, C. Hansch, P. G. Sammens, J. B. Taylor and C. A. Ramsden, Eds., p. 295, Pergamon Press, 1990). The fragment approach is based on the chemical structure of each perfume ingredient, and takes into account the numbers and types of atoms, the atom connectivity, and chemical bonding. The ClogP values, which are the most reliable and widely used estimates for the physiochemical property, are preferably used instead of the experimental logP values in the selection of perfume ingredients which are useful in the present invention. The Kovats Retention Index is an accurate method of reporting gas chromographic (GC) data for interlaboratory substance identification. It is used for eliminating the effects of instrument parameters on the correlations between retention time and the chemical identification by CG. The Kovats Index (I or KI) value of many perfume ingredients has been reported. The Kovats Index value of an unknown substance can be calculated from n equation known in the art.

The cleaning implement is preferably stored and presented to the consumer in a sealed or resealable container. Typically, this is to prevent the loss of any free perfume during storage. The cleaning implement herein comprises a layer of melamine foam preferably having a thickness of at least 5 mm. Preferably, the cleaning implement is cuboidal. The total volume of a layer of melamine foam in the cleaning implement herein is preferably from 50 $cm^3$ to 400 $cm^3$, more preferably from 80 $cm^3$ to 300 $cm^3$, even more preferably from 150 $cm^3$ to 275 $cm^3$, and most preferably from 200 $cm^3$ to 250 $cm^3$. Thickness is understood to be the length in mm of the side having the smallest extension compared to other sides of the melamine foam layer (the height of the melamine foam layer). In case the cleaning implement is based on a rectangular shape and the melamine foam layer extends in parallel to the sides of the shape having the largest surface area (extensions in the x and y axis), the thickness can be referred to as the extension in the direction of the y axis. In case the cleaning implement is based on an irregular shape and/or the extension of the thickness of the melamine foam layer varies (i.e., the layer is thicker in some parts of the implement as compared to others), it is sufficient that at least once the thickness of the melamine foam layer extends over the thickness required herein. In a preferred embodiment of the present invention the melamine foam is a melamine-formaldehyde resin foam. Melamine-formaldehyde resin foam raw materials are well known and a commercially available example is sold under the trade name Basotect® from BASF. Supporting material is typically understood to typically mean a non-melamine material, preferably a foam, non-woven, woven, film, scrim or grid, which is typically used to provide mechanical support, absorb excess water or provide improved abrasiveness or combinations thereof. The supporting material, when present, may also comprise chemicals or compositions useful in the cleaning of hard surfaces. These chemicals or compositions may be the same or different to any used in the melamine foam if present. If they are different, the supporting sponge may be used to carry chemicals or compositions suitable for use in hard surface cleaning which are incompatible with those present in the melamine foam or the melamine foam itself. Preferably, perfume sources may be used to indicate similarities or differences in the chemicals or compositions present in the melamine foam or the supporting material. Preferably the perfume sources would also be used to mask any undesirable odour associated with said chemicals or compositions. When the cleaning implement comprises a series of alternating layers of melamine foam and supporting material, the melamine and supporting material layers may again be used to carry chemicals or compositions to aid the cleaning process. The different layers of melamine may contain the same or different chemicals or compositions and in turn the supporting material may contain the same or different chemicals or compositions to each or both of the melamine foam layers. In addition, any individual layer might not support any chemicals or compositions to aid the cleaning process. The presence or absence of such chemicals or compositions may preferably be signalled by using perfume sources. Examples of chemicals or compounds which may preferably be present in either the supporting material or the melamine foam include but are not limited to odour control agents, enzymes, surfactants, chelants, anti-foaming agents, bleaches, builders, bleach activating agents, bleach catalysts, biocides, lime scale reducing additives and combinations thereof. When the perfume source is to be located throughout the melamine foam or within the supporting material it is preferably distributed therein by being sprayed in the form of droplets or solid particulates onto at least one side of the foam. Spraying may also be used to distribute the perfume source over what is to become the interface between the melamine foam and supporting foam or multiple layers of melamine foam. Nebulisers and atomisers, or any other means for producing droplets or particulates, are particularly preferred. Preferably, a series of spray sources will be used to spray a series of rows of perfume source across the foam. When the perfume source is a liquid or the perfume source is applied using a solvent, preferably the perfume source droplets will have a diameter less than that of the pores of the foam onto which they are sprayed. In the same way, where the perfume source is a solid particulate, for instance a perfume encapsulate or perfume loaded porous carrier particle, then preferably the particulate will be smaller than the pores of the foam. Without wanting to be bound by theory, it is believed that the pores of the melamine foam are typically between 50 and 400 microns in diameter, preferably 200 microns. It would therefore be preferable to use droplets or particulates having a diameter of less than 150 microns in diameter, even more preferably less than 100 microns and even more preferably less than 50 microns in diameter, so that they may permeate throughout the foam. Preferably, the permeation of the perfume source throughout the foam will be encouraged by the use of a vacuum on the opposite side of the foam to where the perfume source is being applied. The perfume source may also be applied by spraying the foam from more than one side at once, preferably the two opposing sides perpendicular to the thickness of the foam. The perfume source may also be distributed throughout the foam by spraying the foam along one side, before repeating the process along the opposing side. Preferably, the two opposing sides will be those perpendicular to the thickness of the foam. Alternatively, if the perfume source is a liquid or dispersed in a liquid, the perfume source may typically be distributed throughout the melamine foam or the supporting material by soaking the melamine foam or supporting material in the perfume source or a solution containing the perfume source. Excess perfume solution may then be squeezed out and/or the cleaning implement may be left to dry. When the perfume source is located within either the melamine foam, supporting material or both in the form at least one discreet volume of perfume source, preferably a matrix polymer-assisted delivery composition is used and introduced into the melamine foam, supporting material or both, by first heating the matrix polymer-assisted delivery composition until it melts and then syringing the melted matrix polymer-assisted delivery composition inside the melamine foam or supporting material or both, and thus forming at least one discreet volume of matrix. As the matrix cools, the discreet volumes solidify and remain anchored within the melamine foam or supporting material. Syringing is meant to include any means for introducing the perfume source into the melamine foam or supporting material wherein a device, typically a syringe, is used to introduce the perfume source at a point below the outer surface of the cleaning implement. As the matrix polymer-assisted delivery composition is syringed into the melamine foam or supporting material and becomes anchored therein, it is possible to ensure that the matrix-assisted delivery system does not breach the surface of the melamine foam or supporting material. Preferably, the matrix polymer-assisted delivery composition is delivered in the form of a hot melt. Even more preferably, the matrix polymer-assisted delivery system has a melting point below 100° C., preferably below 70° C. Preferably the present invention may also comprise an odour control agent. Uncomplexed cyclodextrins suitable for use as odour control agents in the present invention preferably include any of the known cyclodextrins in uncomplexed form such as unsubstituted cyclodextrins containing from six to twelve glucose units, especially, alpha-cyclodextrin, beta cyclodextrin, gamma-cyclodextrin and their derivatives and mixtures thereof. Alpha-cyclodextrin consists of six glucose units, beta-cyclodextrin consists of seven glucose units, and gamma-cyclodextrin consists of eight glucose units arranged in doughnut-shaped rings. When cyclodextrins are present it is also preferable to include an anti-microbial. Examples of preferred water-soluble cyclodextrin derivatives suitable for use herein are hydroxypropyl alpha-cyclodextrin, methylated alpha-cyclodextrin, methylated beta-cyclodextrin, hydroxyethyl beta-cyclodextrin and hydroxypropyl beta-cyclodextrin. A known methylated beta-cyclodextrin is heptakis-2,6-di-O-methyl-β-cyclodextrin, commonly known DIMEB, in which each glucose unit has about two methyl groups with a degree of substitution of 14. A preferred, more commercially available, methylated beta-cyclodextrin is a randomly methylated beta-cyclodextrin, commonly known as RAMEB, having different degrees of substitution, normally about 12.6. The proffered cyclodextrins are available e.g. from Cerestar USA Inc. and Wacker Chemicals (USA), Inc. It is preferable to use a mixture of different cyclodextrins. Flavanoids can also be used as an odour control agent. Flavanoids are compounds based on the $C_6C_3C_6$ flavan skeleton. Flavanoids can be found in typical essential oils. Such oils include essential oil extracted by dry distillation from needle leaf trees and grasses such as cedar, Japanese cypress, eucalyptus, Japanese red pine, dandelion, low striped bamboo and cranesbills can contain terpenic materials such as alpha-pinene, beta-pinene, myrcene, phencone and camphene. Also, included are extracts from tea leaf. Descriptions of such materials can be found in JP 04030855 and JP 02284997. The odour control agents can also be zeolites. A preferred class of zeolites are intermediate zeolites, characterised by $SiO_2/AlO_2$ ranges from about 2 to about 10. Intermediate zeolites are preferred as they have a higher affinity for amine-type odours and are moisture tolerant compared to higher zeolites. A wide variety of intermediate zeolites suitable for use herein are commercially available such as Vlafor® CP301-68, Valfor® 306-63, Valfor® CP300-35, and Valfor® CP300-56, available from PQ corporation, and the CBV100® series of zeolites from Conteka. Activated carbon is another suitable odour control agent for incorporation in the cleaning implement. Activated carbon or activated charcoal as it is sometimes referred to is well known in commercial practise as an absorbent of organic molecules and/or for air purification purposes. Such carbon is available from commercial sources under the trade names Calgon-Type CPG®, Type PCB®, Type SGL®, Type CAL® Type OL® and Centaur®. Suitable silica gels are available from Grace. In another aspect of the present invention there is provided a method of using said cleaning implement for removing soils from hard surfaces. Preferably, the method comprises the steps of wetting the cleaning implement and then preferably contacting the surface which requires cleaning with the wetted implement. Typically, contacting is meant to include wiping, swiping, rubbing, dabbing or the like. Typically, wetting is meant to encompass wetting with any suitable solvent, such as tap water. Preferably, the supporting material may be used in an additional method step to remove or absorb any excess water or any melamine foam particulates from the surface. Preferably, the supporting material may also be used to abrade or remove any stubborn or difficult to remove soils as an additional method step. Preferably, when a volume of the melamine foam has been used, and thereby soiled, it is broken off to expose unsoiled foam and to prevent contamination of unused melamine foam.

EXAMPLES

In each example, unless otherwise stated, the sheets or laminates of foam were cut into cleaning implements having lengths of 120 mm and widths of 60 mm. Their thicknesses in each example were dependent on the plies used in each instance.

Example 1

A low melting point hotmelt matrix polymer-assisted delivery composition comprising 30% by weight thereof Elvax 250, 15% by weight thereof Foralyn 5020F, 5% by weight thereof Kristalex F85, 10% by weight thereof acetyl tributyl citrate, and 40% by weight thereof Liquiblu 4 perfume (Procter & Gamble) was prepared. The composition was then heated until fully melted at 70° C. in a melting tank, before a hotmelt pump with a slot-coating nozzle (Nordson®) was used to slot-coat the composition at 125 g/m² of foam surface, in a series of distinctive lanes, onto the surface of melamine foam sheet (Basotect® from BASF). The melamine foam sheet had a thickness 15 mm. An open-cell polyurethane foam (Sweetane® series by Recticel®) having a thickness of 6 mm was adhered to the melamine foam along the surface coated with the matrix polymer-assisted delivery composition.

Example 2

A low melting point polymer matrix composition comprising 25% by weight thereof Pebax 2533, 15% by weight thereof acetyl tributyl citrate, and 60% by weight thereof Perfume Utopia MOD M1 from IFF was heated until fully melted (80° C.). Then, using a Nordson® hotmelt pump fitted with a spraying nozzle, 40 g/m² of foam of the polymer matrix composition was sprayed over the surface of a melamine foam sheet (Basotect® from BASF) having a thickness of 10 mm. A closed-cell polypropylene foam (Zotefoam®) having a thickness of 10 mm, was then sandwiched between two sheets of the matrix coated melamine foam. The three-ply laminate was then compressed to allow the penetration of the hotmelt into the melamine and polypropylene foams.

Example 3

An aqueous slurry comprising breakable perfume microcapsules was deposited evenly, at 70 g/m² of foam, over one of the two faces of greatest area of a melamine foam sheet (Basotec® from BASF) having a thickness of 14 mm. A second sheet of melamine foam was then laminated to the first sheet using an adhesive in such an arrangement that the microcapsules were located along the interface between the two plies. The perfume microcapsules' size distribution was such that at least 50% of the microcapsules exceeded 100 microns in diameter. The slurry contained 30% by weight thereof of encapsulated perfume selected of Lillial, Cyclacet or Lemonvert by Procter & Gamble. The perfume microcapsules were made of acrylamide-acrylic copolymer crosslinked with melamine-formaldehyde resin.

Example 4

70 g/m² of a slurry of breakable perfume microcapsules was deposited on the surface of a melamine foam sheet (Basotec® from BASF) of 10 mm thickness. A closed-cell polypropylene foam (from Zotefoam®) having a thickness of 5 mm was then laminated between two sheets of the coated melamine foam. The diameters of the microcapsules were from 5 microns to 50 microns. The perfume microcapsule slurry contained 20% by weight thereof of encapsulated perfume selected from Downy or Lemonvert perfume by Procter & Gamble, or a perfume mix of 5% by weight thereof allylamylglycollate, 5% by weight thereof citraldiethylacetal, 30% by weight thereof linalool, 30% by weight thereof linalyl acetate and 30% by weight thereof orange oil. The microcapsule shells comprised aminoplast melamine coated with 25% by weight of the slurry of cationically modified starch (HI-CAT CWS from Roquette®) or guar gum (Luguar C-162 by Rhodia).

Example 5

0.2 g of the perfume microcapsule slurry, as described in Example 4, were mixed with 5 ml of a solvent comprising 35% by weight thereof ethanol and 65% by weight thereof water. The dispersed microcapsules were then sprayed into a block of melamine foam (Basotect® from BASF) having the following dimensions: 28 mm by 120 mm by 60 mm.

Example 6

3 g of Beta cyclodextrin particles (from Wacker), having a diameter above 150 microns, were stirred with 50 ml of water and 1 g of Downy or Lemonvert perfume (both from Procter & Gamble) for about 1 hour to allow the cyclodextrin and perfume to complex. The suspension was then sprayed over the surface of a melamine foam sheet, (Basotect® from BASF) having a thickness of 14 mm, at a concentration of about 40 g/m² of foam. The melamine foam sheet was then laminated to a second layer of melamine foam of equal thickness using an adhesive.

Example 7

A composition of 50% by weight thereof zeolite A and 50% by weight thereof mesoporous silica ZSM-5, with particle sizes above 150 microns, was deposited, at a concentration of about 40 g/m² of foam, across one of the two largest surfaces of a melamine foam sheet (Basotect® from BASF): thickness 14 mm. A perfume raw material selected from Lillial, Cyclacet, Downy or Lemonvert perfume by Procter & Gamble, or a perfume mix of 5% by weight thereof allylamylglycollate, 5% by weight thereof citraldiethylacetal, 30% by weight thereof linalool, 30% by weight thereof linalyl acetate and 30% by weight thereof orange oil was then sprayed onto the zeolite/silica particles covering the surface of the melamine foam at a concentration of 16 g/m² of foam. A second sheet of melamine foam of equal thickness was then adhered to the first melamine foam so as to form a two-ply laminate with the perfume-loaded porous carrier-particles being located at the interface between the two plies.

Example 8

Examples 1-7 were repeated; however, this time an uncomplexed cyclodextrin powder (Beta cyclodextrin from Wacker), having particle sizes above 150 microns, was sprayed at a concentration of 70 g/m² of foam, across the surface of the finished cleaning implement.

What is claimed is:

1. A cleaning implement comprising a melamine foam having a thickness of at least about 5 mm and a perfume source wherein the perfume source is in the form of a composition including a perfume incorporated in a continuous phase of a polymer matrix and wherein the perfume source is present as at least one discrete volume within the melamine foam, wherein the at least one discreet volume is from about 0.1 mm³ to about 5 cm³ in volume, wherein delivery of perfume from the perfume source is triggered by pressure, pH, ionic strength, temperature or combinations thereof.

2. A cleaning implement according to claim 1 wherein the cleaning implement is capable of delivering perfume during use at least until substantially all of the melamine foam has been consumed.

3. A cleaning implement according to claim 1 comprising at least one layer of a supporting material or at least two layers of melamine foam or a combination thereof.

4. A cleaning implement according to claim 3, comprising at least two layers of melamine foam with each layer of melamine foam being separated from the next layer of melamine foam by at least one layer of supporting material.

5. A cleaning implement according to claim 3 wherein any adjacent layers are joined by means of a permanent attachment selected from the group consisting of foam flame laminating the two layers together; use of a permanent adhesive; sewing the layers together; needle punching the layers together; and combinations thereof.

6. A cleaning implement according to claim 1 wherein the cleaning implement further comprises an odour control agent.

7. A cleaning implement according to claim 1 wherein the melamine foam is melamine-formaldehyde resin foam.

8. A method for cleaning surfaces using the cleaning implement of claim 1 comprising wetting the implement and then contacting a surface which requires cleaning with the wetted implement.

* * * * *